(No Model.)
E. L. PERRY.
HOLLOW RUBBER ARTICLE.
No. 521,246. Patented June 12, 1894.
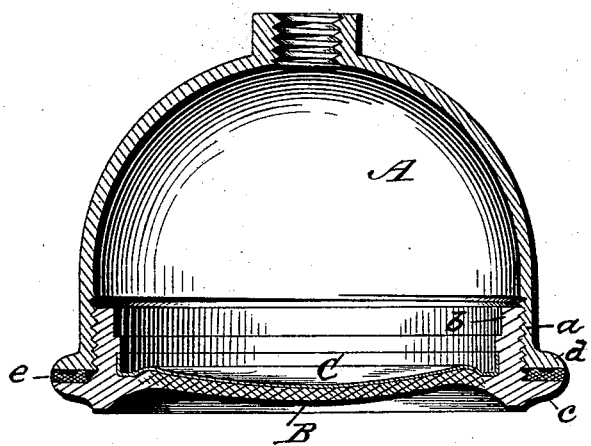
Witnesses
C. J. Williamson.
M. J. Evans.
Inventor
Edward L. Perry,
per Chas. H. Fowler,
Attorney.

UNITED STATES PATENT OFFICE.

EDWARD L. PERRY, OF PATERSON, NEW JERSEY.

HOLLOW RUBBER ARTICLE.

SPECIFICATION forming part of Letters Patent No. 521,246, dated June 12, 1894.

Application filed April 20, 1894. Serial No. 508,255. (No model.)

*To all whom it may concern:*

Be it known that I, EDWARD L. PERRY, a citizen of the United States, residing at Paterson, in the county of Passaic and State of New Jersey, have invented certain new and useful Improvements in Hollow Rubber Articles; and I do hereby declare that the following is a full, clear, and exact description of the same, reference being had to the annexed drawings, making a part of this specification, and to the letters of reference marked thereon.

The present invention has relation to that class of hollow rubber articles shown and described in my former patent bearing date the 5th day of September, 1893, and numbered 504,612 and is intended as an improvement thereon whereby the soft rubber bottom of the vessel when used for containing oil will be protected from contact therewith and the elasticity of the bottom preserved, and the invention consists in providing the soft rubber bottom with an inner lining of spring metal, substantially as shown in the drawings and hereinafter described and claimed.

Figure 1 of the drawings represents a sectional elevation of an oil-can or cup embodying my invention, which is one of the many forms of hollow rubber articles to which my improvement may apply; Fig 2 a sectional elevation of the spring metal lining used in protecting the soft rubber bottom of the oil-can or cup or other hollow rubber article to which it may be applied.

In the accompanying drawings A represents the body of the oil-can or cup which is composed of hard rubber or vulcanite and is formed with interior screw threads $a$ to engage with the screw threads upon the upwardly projecting flange $b$ upon the bottom B. The hollow body A and the bottom B have respectively outwardly extending flanges $d$ $c$ between which is located an elastic packing ring, said ring being compressed between the flanges to secure a tight joint.

The bottom B is of soft rubber and the flanges $b$ $c$ are of hard rubber or vulcanite to reinforce said bottom and strengthen it, these features forming the subject of the claim in my former patent and further reference thereto is considered unnecessary.

It has been found that the oil contained in the cup or other vessel continually coming in contact with the soft rubber from which the bottom is composed, would through chemical action, destroy its elasticity and render the bottom useless for the purpose intended. When pressure was applied to the soft rubber bottom to force the oil out through the tube, the inherent property of the soft rubber to resume its former shape when pressure was removed would be absent, and consequently the usefulness of the bottom would be destroyed. It is therefore desirable and important to the perfect operation of the bottom that the elastic quality of the soft rubber should be preserved, and to attain this end I provide a lining to the bottom as shown at C, which lining is composed of spring sheet metal.

The lining C has an upturned circumferential flange $f$ and a flat extension $g$ which together form a double flange rim with the flanges at right angles to each other as shown.

The lining C is concavo-convex in shape and its outer edge is raised above the plane of the flange or flat extension $g$ whereby the greatest possible strength is secured in the lining. The bottom B conforms to the shape of the lining C and the two are connected together in the process of forming the bottom or by any other manner found most preferable.

The sheet metal lining must necessarily be made very thin in order to secure the maximum degree of elasticity or springy quality of the metal, and consequently the bottom side of the lining should be protected against indentation or injury by coming in contact with any hard substance. The soft rubber bottom therefore serves as a backing or cushion to the sheet metal lining to protect it against injury while the lining in turn protects the soft rubber bottom from contact with the oil and thereby preserves its elasticity, the bottom and lining each protecting the other to render both effective and useful in providing a more perfect article.

Having now fully described my invention, what I claim as new, and desire to secure by Letters Patent, is—

1. An oil-can or other hollow rubber article having a bottom of soft rubber and an inner lining thereto composed of spring sheet metal, substantially as and for the purpose set forth.

2. An oil-can or other hollow rubber article having a body of hard rubber or vulcanite and a bottom of soft rubber, and an inner lining to the soft rubber bottom constructed of spring sheet metal, substantially as and for the purpose described.

3. An oil-can or other hollow rubber article having a body of hard rubber or vulcanite and a detachable bottom of soft rubber having its flanged portion of hard rubber or vulcanite, and a lining to the soft rubber bottom formed of spring sheet metal, substantially as and for the purpose specified.

4. An oil-can or other hollow rubber article having a soft rubber bottom and a lining therefor constructed of spring sheet metal, having a concavo-convex central portion and a double flanged rim, substantially as and for the purpose set forth.

In testimony that I claim the above I have hereunto subscribed my name in the presence of two witnesses.

EDWARD L. PERRY.

Witnesses:
W. G. WINANS,
C. F. E. MASTIN.